United States Patent [19]
Nguyen et al.

[11] Patent Number: 6,043,634
[45] Date of Patent: Mar. 28, 2000

[54] INTERLEAVED SWITCHING REGULATOR

[75] Inventors: Don J. Nguyen, Portland; Thovane Solivan, Hillsboro, both of Oreg.

[73] Assignee: Intel Corporation, Santa Clara, Calif.

[21] Appl. No.: 09/219,291

[22] Filed: Dec. 22, 1998

[51] Int. Cl.[7] .................................................... G05F 1/59
[52] U.S. Cl. ............................................................ 323/272
[58] Field of Search .................................. 323/268, 271, 323/272, 282, 351

[56] References Cited

U.S. PATENT DOCUMENTS

| | | | |
|---|---|---|---|
| 3,978,393 | 8/1976 | Wisner et al. | 323/272 |
| 4,595,873 | 6/1986 | Musil | 323/222 |
| 5,672,958 | 9/1997 | Brown et al. | 323/269 |
| 5,905,369 | 5/1999 | Ishii et al. | 323/272 |

*Primary Examiner*—Adolf Deneke Berhane
*Attorney, Agent, or Firm*—Trop, Pruner, Hu & Miles, P.C.

[57] ABSTRACT

A switching regulator includes a controller, an inductor, switch circuits coupled to the inductor and a synchronization circuit. The controller furnishes a switching signal to regulate an output voltage, and each of the switch circuits, when activated, responds to the switching signal to energize and de-energize the inductor. The synchronization circuit selectably activates each switch circuit during different time intervals of the switching signal.

24 Claims, 8 Drawing Sheets

INTERLEAVED SWITCHING REGULATOR

BACKGROUND

The invention relates to a voltage regulator, such as a switching voltage regulator.

A DC-to-DC voltage regulator typically is used to convert a DC input voltage to either a higher or a lower DC output voltage. One type of voltage regulator is a switching regulator that is often chosen due to its small size and efficiency. The switching regulator typically includes one or more switches that are rapidly opened and closed to transfer energy between an inductor (a stand-alone inductor or a transformer, as examples) and an input voltage source in a manner that regulates an output voltage.

Figure 1:
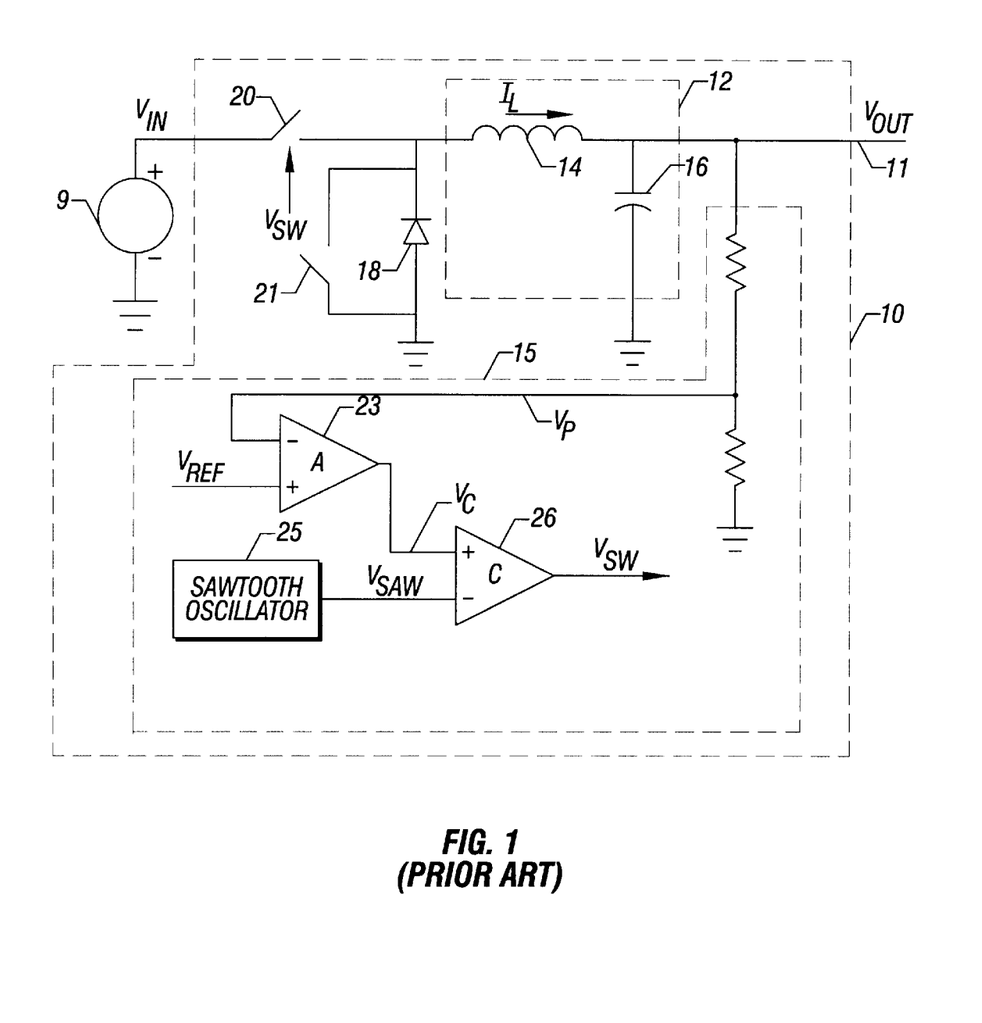
FIG. 1 is a schematic diagram of a switching voltage regulator of the prior art.

As an example, referring to FIG. 1, one type of switching regulator is a synchronous Buck switching regulator 10 that receives an input DC voltage (called $V_{IN}$) and converts the $V_{IN}$ voltage to a lower regulated output voltage (called $V_{OUT}$) that appears at an output terminal 11. To accomplish this, the regulator 10 may include a switch 20 (a metal-oxide-semiconductor field-effect-transistor (MOSFET), for example) that is operated (via a voltage called $V_{SW}$) in a manner to regulate the $V_{OUT}$ voltage, as described below.

Figure 2:
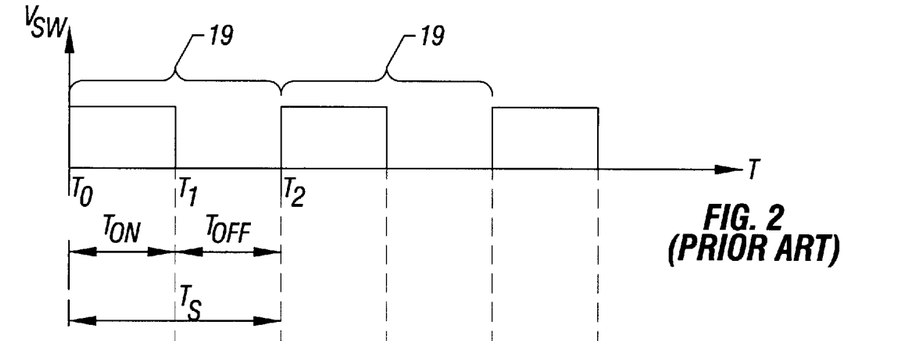
FIGS. 2, 3, 4 and 5 are current and voltage waveforms that illustrate operation of the regulator of FIG. 1.
Figure 3:
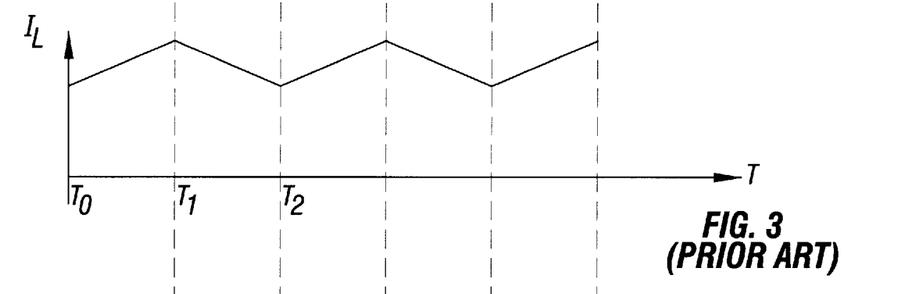

Referring also FIGS. 2 and 3, in particular, the switch 20 opens and closes to control energization/de-energization cycles 19 (each having a constant duration called $T_S$) of an inductor 14. In each cycle 19, the regulator 10 asserts, or drives high, the $V_{SW}$ voltage during an on interval (called $T_{ON}$) to close the switch 20 and transfer energy from an input voltage source 9 to the inductor 14. During the $T_{ON}$ interval, a current (called $I_L$) of the inductor 14 has a positive slope. During an off interval (called $T_{OFF}$) of the cycle 19, the regulator 10 deasserts, or drives low, the $V_{SW}$ voltage to open the switch 20 and isolate the input voltage source 9 from the inductor 14. At this point, the level of the $I_L$ current is not abruptly halted, but rather, a diode 18 begins conducting to transfer energy from the inductor 14 to a bulk capacitor 16 and a load (not shown) that are coupled to the output terminal 11. During the $T_{OFF}$ interval, the $I_L$ current has a negative slope, and the regulator 10 may close a switch 21 to shunt the diode 18 to reduce the amount of power that is otherwise dissipated by the diode 18. The bulk capacitor 16 serves as a stored energy source that is depleted by the load, and additional energy is transferred from the inductor 14 to the bulk capacitor 16 during each $T_{ON}$ interval.

For the Buck switching regulator, the ratio of the $T_{ON}$ interval to the $T_{OFF}$ interval, called a duty cycle, generally governs the ratio of the $V_{OUT}$ to the $V_{IN}$ voltages. Thus, to increase the $V_{OUT}$ voltage, the duty cycle may be increased, and to decrease the $V_{OUT}$ voltage, the duty cycle may be decreased.

Figure 5:
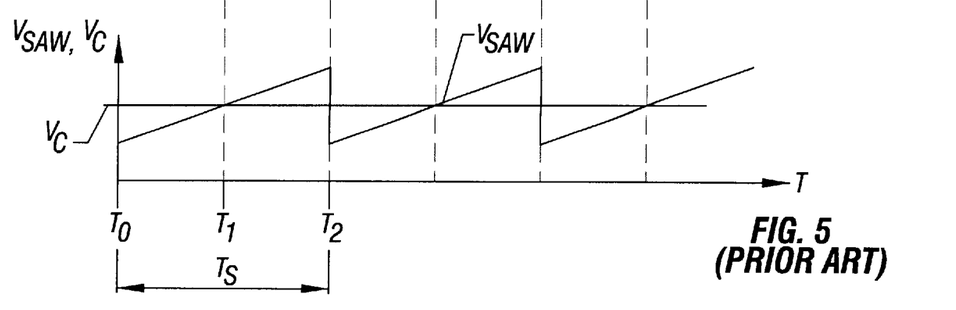

As an example, the regulator 10 may include a controller 15 (see FIG. 1) that regulates the $V_{OUT}$ voltage by using a pulse width modulation (PWM) technique to control the duty cycle. In this manner, the controller 15 may include an error amplifier 23 that amplifies the difference between a reference voltage (called $V_{REF}$) and a voltage (called $V_P$ (see FIG. 1)) that is proportional to the $V_{OUT}$ voltage. Referring also to FIG. 5, the controller 15 may include a comparator 26 that compares the resultant amplified voltage (called $V_C$) with a sawtooth voltage (called $V_{SAW}$) and provides the $V_{SW}$ signal that indicates the result of the comparison. The $V_{SAW}$ voltage is provided by a sawtooth oscillator 25 and has a constant frequency (i.e., $1/T_S$).

Due to the above-described arrangement, when the $V_{OUT}$ voltage increases, the $V_C$ voltage decreases and causes the

2 duty cycle to decrease to counteract the increase in $V_{OUT}$. Conversely, when the $V_{OUT}$ voltage decreases, the $V_C$ voltage increases and causes the duty cycle to increase to counteract the decrease in $V_{OUT}$.

Figure 4:
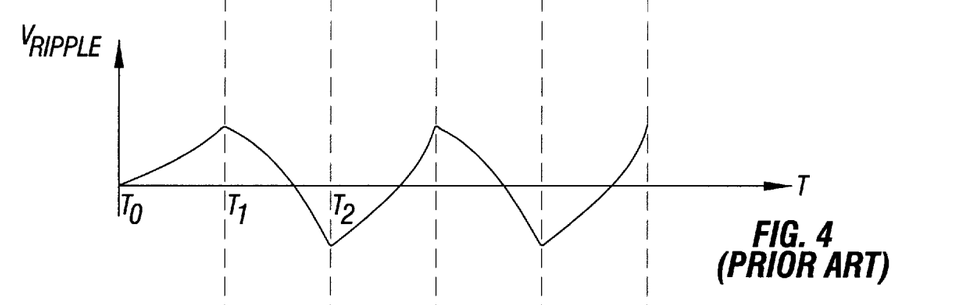

The switching frequency (i.e., $1/T_S$) typically controls the magnitude of an AC ripple component (called $V_{RIPPLE}$ (see FIG. 4)) of the $V_{OUT}$ voltage, as a higher switching frequency typically means a lower magnitude of the $V_{RIPPLE}$ voltage. Unfortunately, a higher switching frequency may present difficulties. For example, a higher switching frequency may cause an increase in magnetic core losses (of the inductor 14, for example). As another example, the power dissipated by the switch 20 increases with a higher switching frequency. One way to decrease the power dissipation is to decrease the resistance of the switch 20 when the switch 20 is closed. For example, if the switch 20 is a MOSFET, the on resistance (called Rds(on)) of the MOSFET may be decreased by forming the switch 20 out of multiple MOSFETs that are connected in parallel and/or increasing the size of the MOSFET(s). However, these techniques typically increase the gate capacitance(s) of the MOSFET(s), an effect that may limit the performance of the switch 20.

Thus, there is a continuing need for a switching regulator that achieves the benefits gained from a high switching frequency without incurring the disadvantages.

SUMMARY

In one embodiment, a method for use with a switching regulator includes generating a switching signal to regulate an output voltage of the regulator. The switching signal is used to operate a first switch circuit during first time intervals of the switching signal to energize and de-energize an inductor. During second time intervals of the switching signal, the switching signal is used to operate a second switch circuit to energize and de-energize the inductor.

In another embodiment, a method for use with a switching regulator includes operating a first switch circuit at a first frequency to energize and de-energize an inductor. A second switch circuit is operated at a second frequency to independently energize and de-energize the inductor independently from the operation of the first switch circuit. The operations of the first and second switch circuits are combined to collectively energize and de-energize the inductor at a rate greater than either the first or second frequencies.

DETAILED DESCRIPTION

Figure 6:
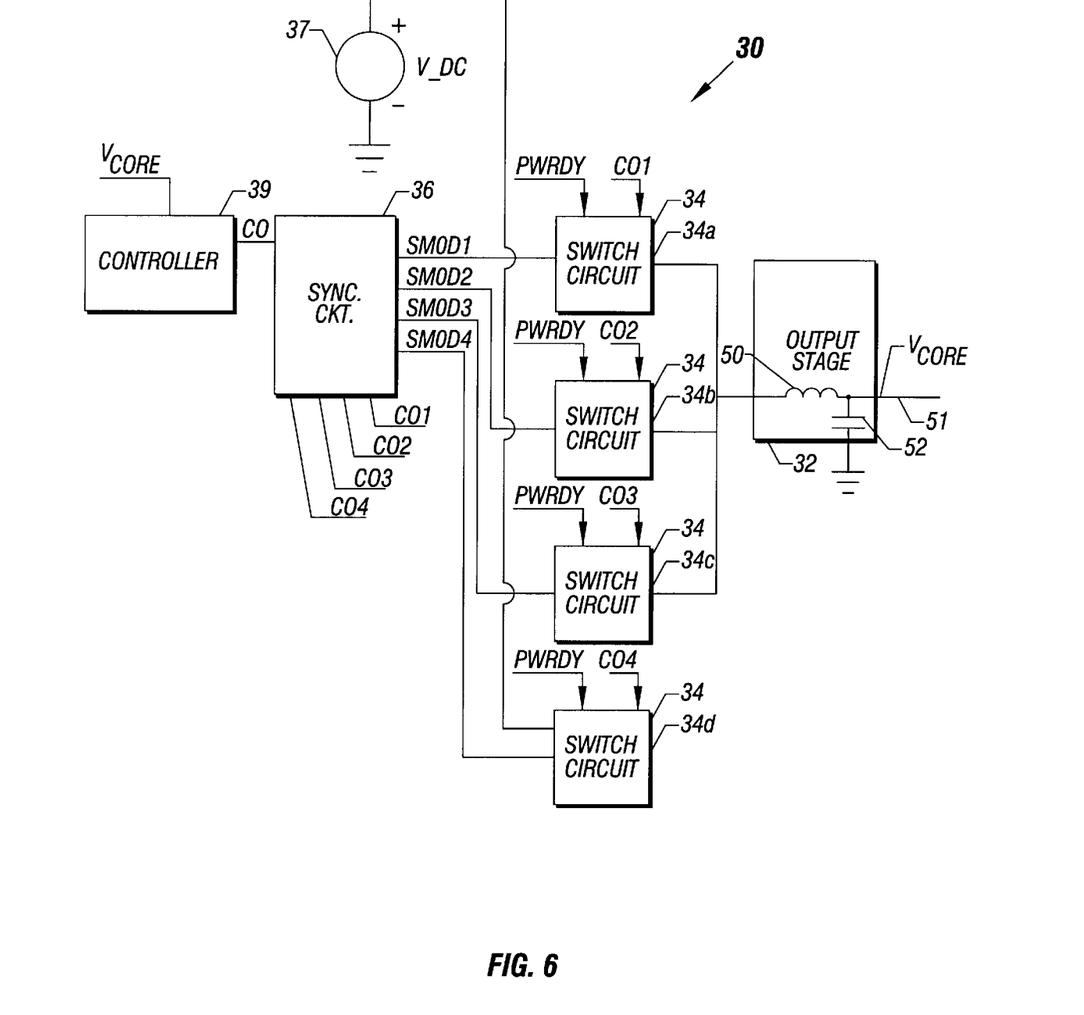
FIG. 6 is a switching voltage regulator according to an embodiment of the invention.

Referring to FIG. 6, an embodiment 30 of a switching voltage regulator in accordance with the invention may include a controller 39 that generates a high frequency, pulse width modulated (PWM) control signal (called CO). The CO signal, in turn, controls energization/de-energization cycles of an inductor 50 to regulate an output voltage (called $V_{CORE}$) that appears at an output terminal 51. A typical switching voltage regulator may include one or more switches that are operated at a high switching frequency, such as the frequency of the CO signal, to regulate an output voltage. However, unlike the typical switching regulator, the regulator 30 time multiplexes the activation of switch circuits 34 (switch circuits 34a, 34b, 34c and 34d, as examples), each of which is coupled to independently energize and de-energize the inductor 50 in a manner that regulates the $V_{CORE}$ voltage. More specifically, in some embodiments, the regulator 30 exclusively activates a different switch circuit 34 during different predetermined time slices of the CO signal and deactivates the switch circuit 34 otherwise. As a result of this arrangement, the switches (described below) of each switch circuit 34 effectively operate at a frequency less than the frequency of the CO signal. Because each switch circuit 34 may control one out of every four, for example, energization/de-energization cycles, an effectively high switching frequency may be achieved while the switches of the switch circuits 34 operate at a much lower switching frequency, as described below.

Figure 9:
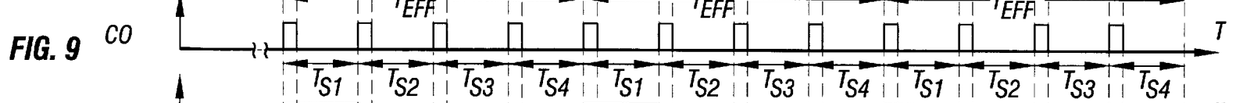
Figure 10:
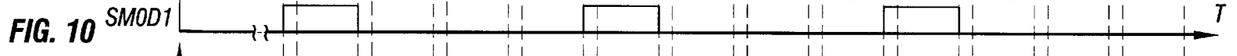
Figure 11:
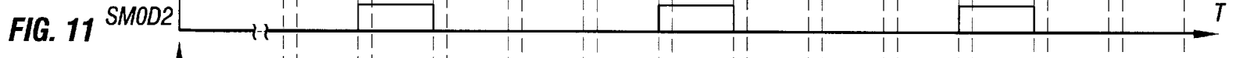
Figure 12:
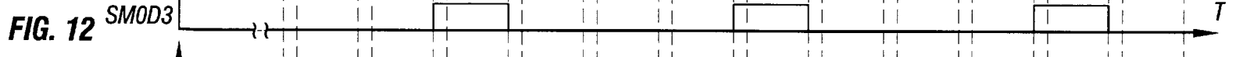
Figure 13:
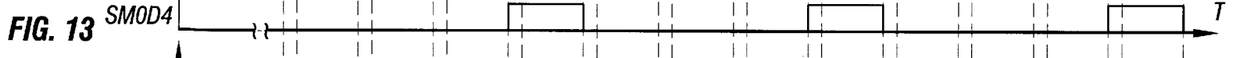
Figure 14:
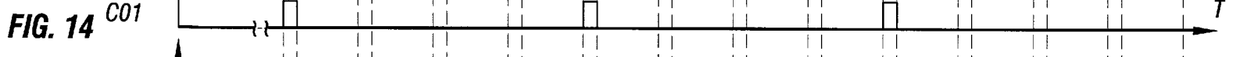
Figure 15:
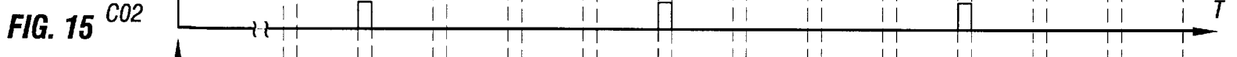
Figure 16:
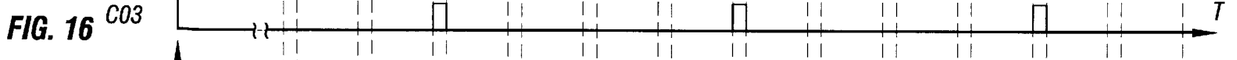
Figure 17:
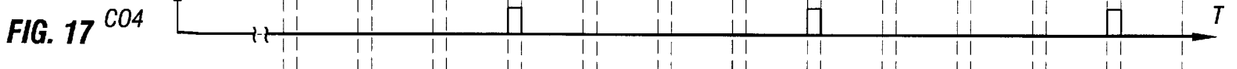
Figures 18, 19:
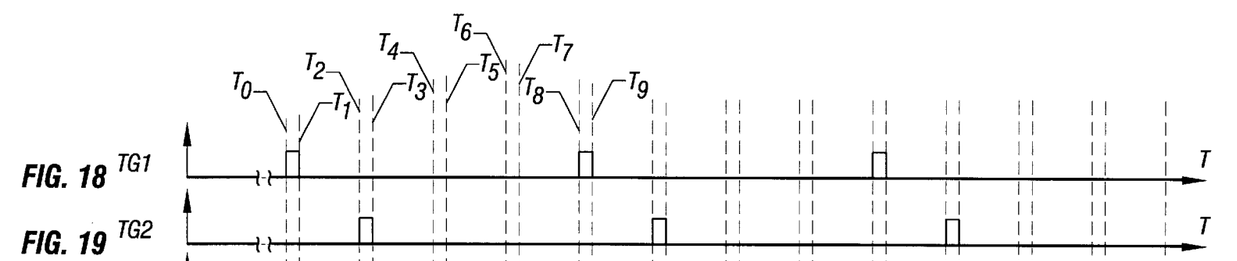
Figure 20:
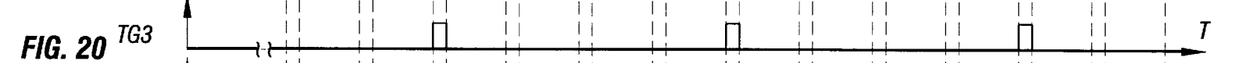
Figure 21:
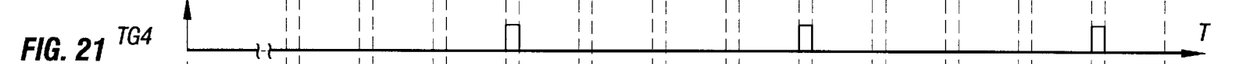
Figure 22:
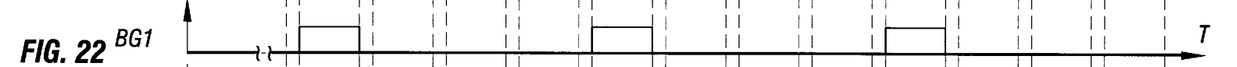
Figure 23:
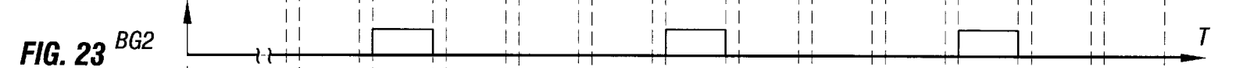
Figure 24:
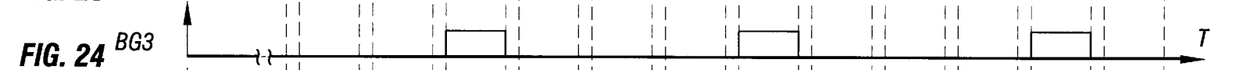
Figure 25:
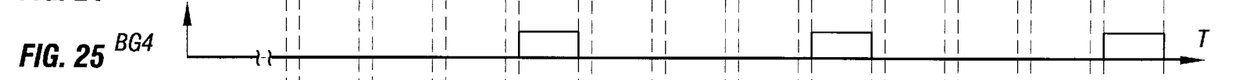

Referring also to FIG. 9, as an example, the switches of each switch circuit 34 may experience an effective switching period (called $T_{EFF}$) that is, in some embodiments, a multiple of the frequency of the CO signal. To accomplish this, each switch circuit 34 may be activated (as described below) during a time interval, or slice (called $TS_1$, $TS_2$, $TS_3$ or $TS_4$, as examples), of the $T_{EFF}$ period and deactivated otherwise. In this manner, each $T_{EFF}$ period may include, in some embodiments, four time slices: the $TS_1$ time slice during which the switch circuit 34a is exclusively active, the $TS_2$ time slice during which the switch circuit 34b is exclusively active, the $TS_3$ time slice during which the switch circuit 34c is exclusively active and the $TS_4$ time slice during which the switch circuit 34d is exclusively active. Referring also to FIGS. 10, 11, 12 and 13, for purposes of activating the switch circuits 34 during the appropriate time slice, the controller 39 may include a synchronization circuit 36 (see FIG. 6) that generates switch circuit enable signals called SMOD1, SMOD2, SMOD3 and SMOD4, to selectively enable the switch circuits 34a, 34b, 34c and 34d, respectively, during the time slices $TS_1$, $TS_2$, $TS_3$ and $TS_4$, respectively. In some embodiments, each time slice has substantially the same duration of the period of the CO signal.

The advantages of the above-described arrangement may include one or more of the following: the effective switching frequency (as seen by the inductor) may be maximized; the operational frequency of the switches may be minimized; the output ripple voltage may be minimized; and a higher power conversion efficiency may be realized.

Referring back to FIG. 6, in some embodiments, the switch circuits 34 are coupled in parallel between an input voltage source 37 (that supplies an input voltage called V_DC) and an output stage 32. As an example, the output stage 32 may include the inductor 50 and a bulk capacitor 52. The bulk capacitor 52 may be coupled between the output terminal of the switch circuits 34 and the output terminal 51.

In some embodiments, when activated, the combination of each switch circuit 34 and the output stage 32 may effectively be an independent synchronous Buck regulator that is operating out of phase with the other synchronous buck regulators. Referring to FIGS. 9, 10, 18, 22 and 28, as an example, the switch circuit 34a may include a drive circuit 38a that generates a top gate signal (called TG1) and a bottom gate signal (called BG1) to control on-off switching of switches, such as metal-oxide-semiconductor field-effect-transistors (MOSFETs) 41 and 43, respectively.

Figure 26:
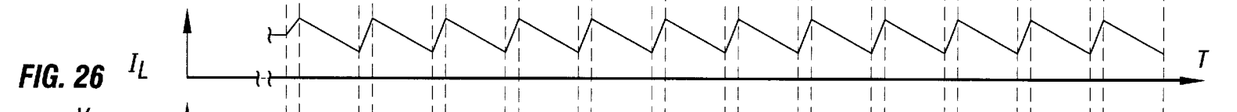

The switch circuit 34a is active from time $T_0$ to time $T_2$, an interval during which the synchronization circuit 36 (see FIG. 6) asserts, or drives high, the SMOD1 signal. From time $T_0$ to time $T_1$, the controller 39 asserts, or drives high, the CO signal. In response to this occurrence, the drive circuit 38a asserts, or drives high, the TG1 signal near time $T_0$ to begin an energization/de-energization cycle of the inductor 50. When the drive circuit 38a asserts the TG1 signal, the MOSFET 41 conducts to cause energy to flow from the input voltage source 37 into the inductor 50, as indicated by the positive slope of an inductor current (called $I_L$) that is shown in FIG. 26. At time $T_1$, the controller 39 deasserts, or drives low, the CO signal which causes the drive circuit 38a to deassert, or drive low, the TG1 signal which turns off the MOSFET 41 and isolates the input voltage source 37 from the inductor 50. At this point, the $I_L$ current in the inductor 50 does not change instantaneously, but, rather, a diode 44 (an intrinsic diode of the MOSFET 43, for example) conducts to transfer stored energy from the inductor 50 to the bulk capacitor 52 and the load (not shown). A short time after the drive circuit 38a deasserts the TG1 signal, the drive circuit 38a asserts the BG1 signal to turn on the MOSFET 43 to shunt the diode 44 and reduce the power otherwise dissipated by the diode 44. At time $T_2$, the synchronization circuit 36 asserts, or drives high, the SMOD1 signal to deactivate the switch circuit 34a. In response to this event, the drive circuit 38a deasserts, or drives low, the BG1 signal to turn off the MOSFET 43 and thus, disconnect the switch circuit 34a from the power stage 32.

Referring also to FIGS. 19, 20, 21, 23, 24 and 25, the other switch circuits 34b (using the TG2 and BG2 signals), 34c (using the TG3 and BG3 signals) and 34d (using the TG4 and BG4 signals) may include similar circuitry that operates in a similar manner to the switch circuit 34a. Furthermore, each of the drive circuits 38 may receive a signal called PWRDY. The PWRDY signal is asserted (driven high, for example) to enable the logic and drive capabilities of the drive circuits 38 when the input voltage to the regulator 30 is within predefined limits. Conversely, the PWRDY signal may be deasserted (driven low, for example) to disable the drive circuits 38 when the input voltage to the regulator 30 is outside of the predefined limits.

The synchronization circuit 36 may include cells 60 (cells 60a, 60b, 60c and 60d, as examples) that are serially coupled together to form a tapped circular delay chain for generating the SMOD1, SMOD2, SMOD3 and SMOD4 switch enable signals at the tapped terminals of the chain. Referring to FIGS. 10, 11, 12 and 13, as an example, at time $T_0$, the cell 60a asserts the SMOD1 signal to activate the switch circuit 34a. The cell 60b, in turn, delays the SMOD1 signal by one period of the CO signal to generate the SMOD2 signal. Similarly, the cell 60c receives and delays the SMOD2 signal by one period of the CO signal to generate the SMOD3 signal, and the cell 60d receives and delays the SMOD3 signal by one period of the CO signal to generate the SMOD4 signal.

Figures 7, 8:
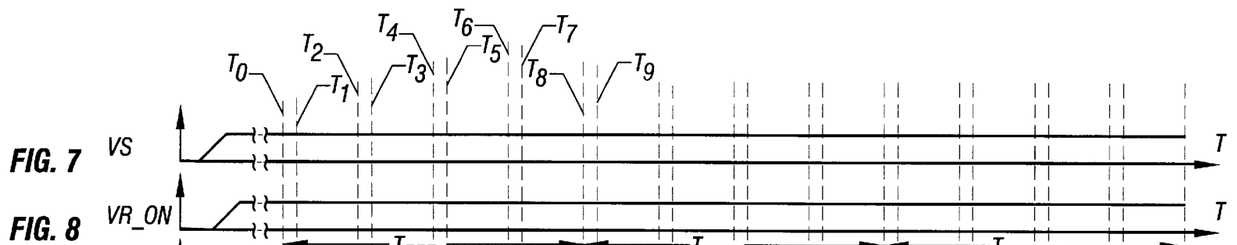
FIGS. 7, 8, 9, 10, 11, 12, 13, 14, 15, 16, 17, 18, 19, 20, 21, 22, 23, 24, 25, 26 and 27 are current and voltage waveforms illustrating operation of the regulator of FIG. 6.

Referring back to FIG. 28, in some embodiments, each cell 60 includes a D-type flip-flop 54 that has an input terminal that is coupled to an output terminal of the appropriate flip-flop 60 of another cell 60 in the circular delay chain. For example, the input terminal of the flip-flop 54 of the cell 60a is coupled to the output terminal of the flip-flop 54 of the cell 60d. Continuing the example, the input terminal of the flip-flop 54 of the cell 60b is coupled to the output terminal of the flip-flop 54 of the cell 60a, and the input terminal of the flip-flop 54 of the cell 60c is coupled to the output terminal of the flip-flop 54 of the cell 60b. To generate the first pulse in the SMOD1 signal, the inverted preset input terminal of the flip-flop 54 receives a signal called VR_ON (see FIG. 8). Before power up, the VR_ON signal is deasserted, or driven low, a state that causes the flip-flop 54 of the cell 60a to assert, or drive high, the SMOD1 signal. After powerup, at time $T_0$, the VR_ON signal is asserted, or driven high, and thereafter, the state of the SMOD1 signal is controlled by the voltage on the input terminal of the flip-flop 54 of the cell 60a. The flip-flops 54, in some embodiments, are clocked by the CO signal.

For some embodiments, each cell 60 also includes a flip-flop 56 to generate signals called C01, C02, C03 and C04 (see FIGS. 14, 15, 16 and 17) that indicate the time slices in which the MOSFETs 41 of the switch circuits 34a, 34b, 34c and 34d, respectively, are to conduct. To accomplish this, the clock terminal of the flip-flop 56 is coupled to the output terminal of the flip-flop 54 of the same cell 60, and the input terminal of the flip-flop 56 is coupled to a logic high signal. In this manner, when the flip-flop 56 is clocked by the rising edge of the SMOD1, SMOD2, SMOD3, SMOD4 signal, the flip-flop 56 generates a pulse in the corresponding CO1, CO2, CO3, CO4 signal for one period of the CO signal.

Figure 27:
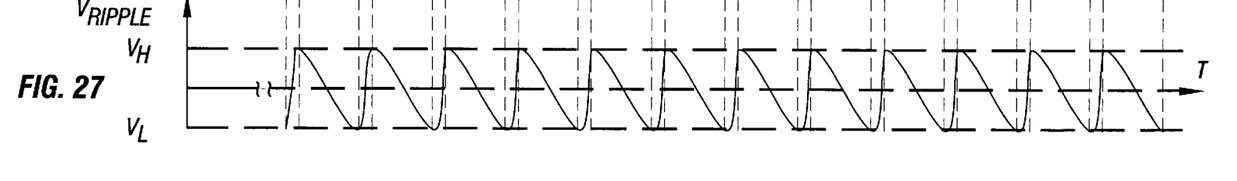
Figure 28:
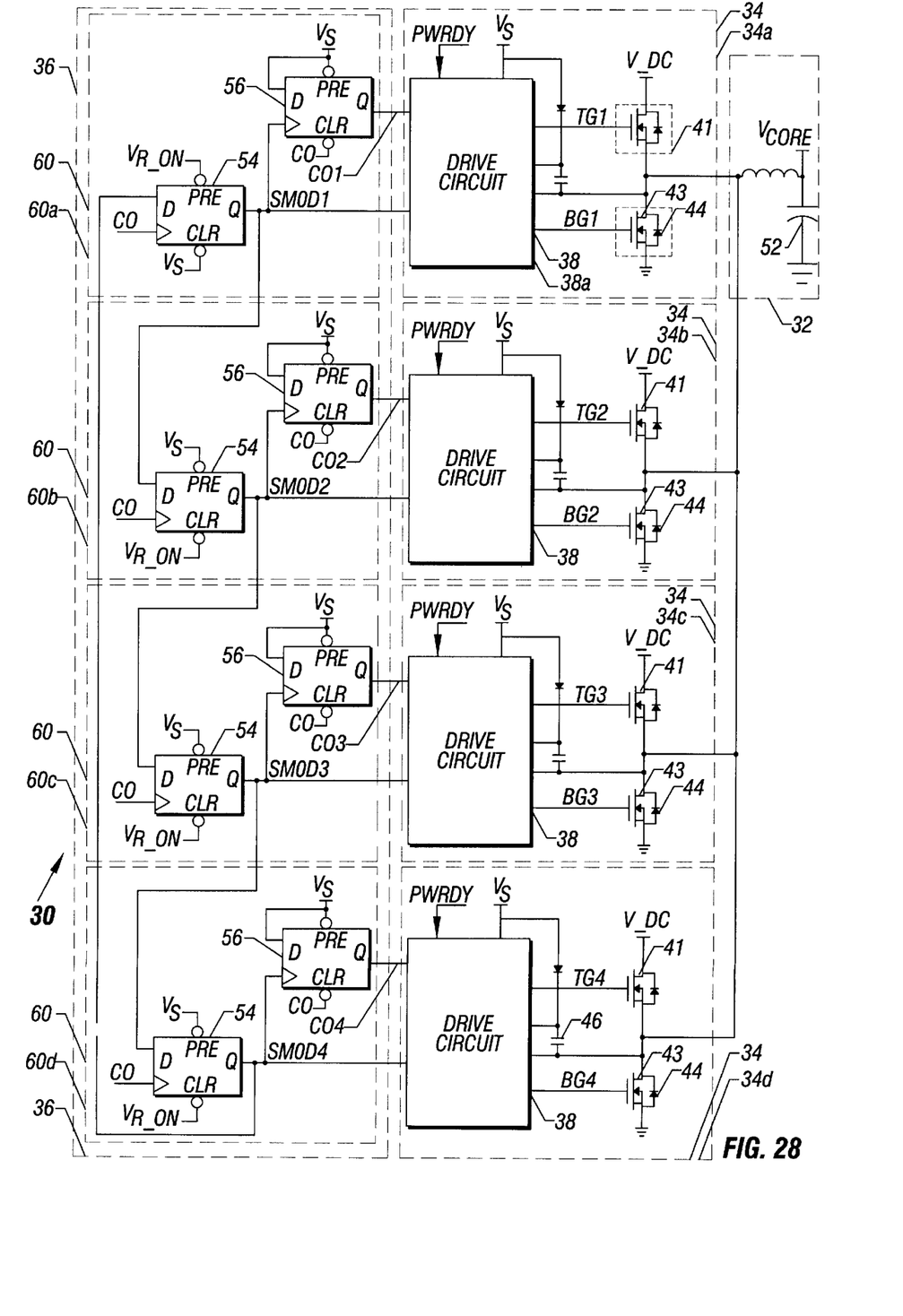
FIG. 28 is a schematic diagram of part of the regulator of FIG. 6.
Figure 29:
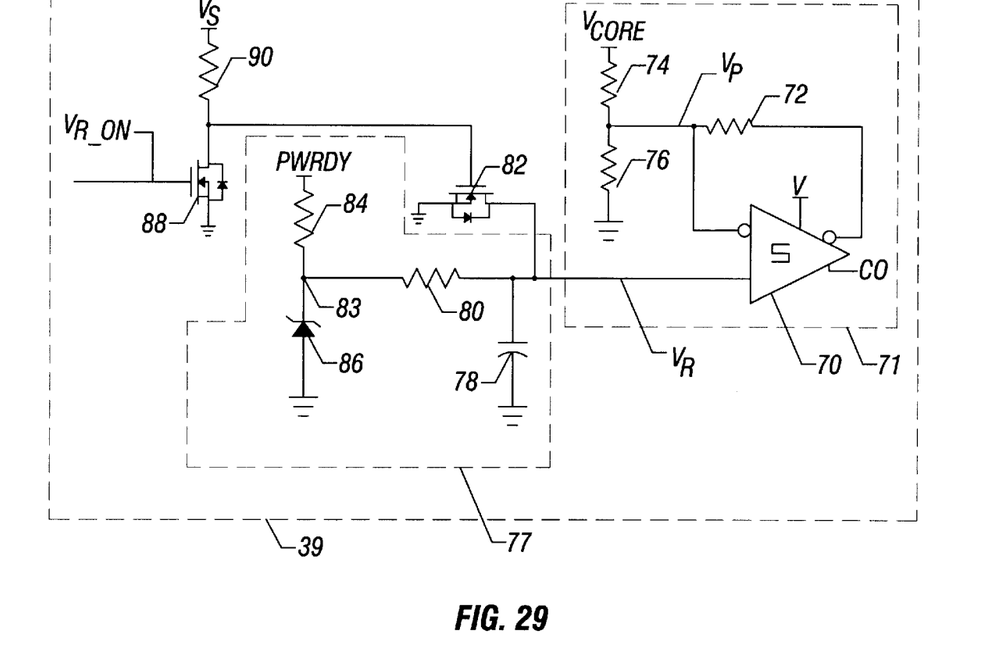
FIG. 29 is a schematic diagram of the controller of the regulator of FIG. 6.

Referring to FIG. 29, in some embodiments, the controller 39 includes a hysteretic comparator circuit 71 which receives the $V_{CORE}$ voltage and generates the CO signal based on the level of a ripple voltage called $V_{RIPPLE}$ (see FIG. 27) of the $V_{CORE}$ voltage. In this manner, when the $V_{RIPPLE}$ voltage reaches a maximum voltage threshold (called $V_H$), the comparator circuit 71 deasserts the CO signal to turn off the MOSFET 41 of the currently active switch circuit 34. Conversely, when the $V_{RIPPLE}$ voltage decreases below a minimum voltage threshold (called $V_L$), the comparator circuit 71 deasserts, or drives low, the CO signal to turn on the MOSFET 41 to transfer energy from the input voltage source to the inductor 50.

To accomplish these features, in some embodiments, the hysteretic comparator circuit 71 includes a comparator 70 and a resistor 72 to establish the hysteresis voltage thresholds $V_H$ and $V_L$. The resistor 72 is coupled between the inverting input and output terminals of the comparator 70. A voltage (called $V_P$) that is proportional to the $V_{CORE}$ voltage is furnished to the inverting input terminal of the comparator 70 by a resistor divider formed from resistors 74 and 76.

The comparator circuit 71 compares the $V_P$ voltage to a reference voltage (called $V_R$) that is furnished by a reference voltage circuit 77. The circuit 77 includes a bandgap reference diode 86 that has its anode coupled to a ground and its cathode coupled to a node 83. The circuit 77 also includes a resistor 84 that is coupled between the PWRDY signal and the node 83 and a resistor 80 that is coupled between the node 83 and the non-inverting input terminal of the comparator 70. A capacitor 78 helps stabilize the value of the $V_R$ voltage and is coupled to the non-inverting input terminal of the computer 70. Thus, when the input voltage to the regulator 30 is outside of predefined limits, the PWRDY signal is deasserted to prevent the $V_R$ voltage from increasing and asserting the CO signal as a result.

To initialize the $V_R$ voltage, in some embodiments, a drain-source path of the MOSFET 82 is coupled in parallel with the capacitor 78 and conducts, during initialization of the regulator 30, to keep the reference voltage $V_R$ substantially equal to zero volts. To accomplish this, the gate of the MOSFET 82 may be coupled to a drain of another MOSFET 88 which has its drain-source path coupled between a positive voltage supply level (called V5 (see FIG. 7)) and ground. During power up, the MOSFET 88 conducts to turn on the MOSFET 82 and thus, set the reference voltage $V_R$ to near zero volts.

Figure 30:
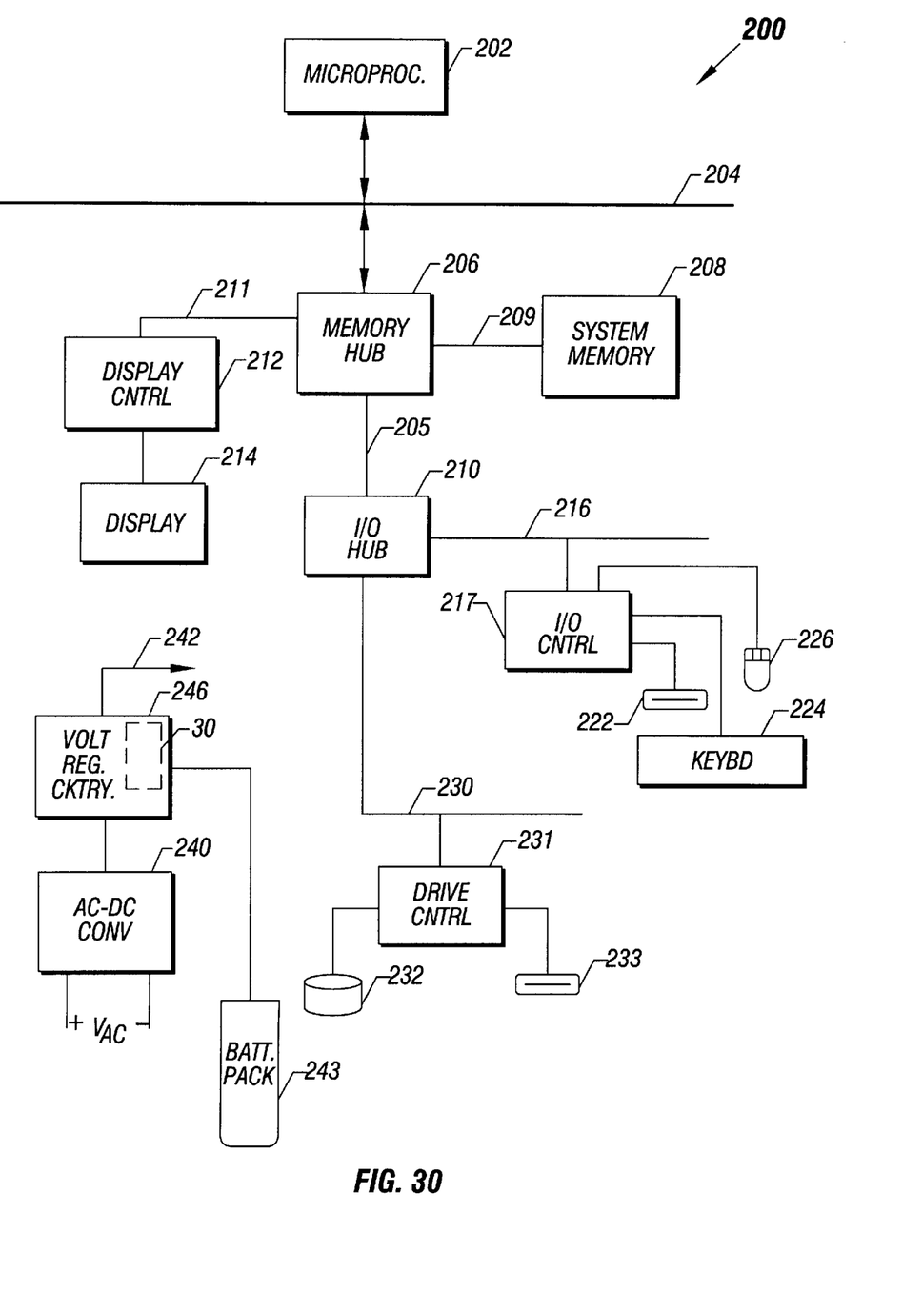
FIG. 30 is a schematic diagram of a computer system according to an embodiment of the invention.

Referring to FIG. 30, the regulator 30 may furnish power to a computer system 200. In this manner, the regulator 30 may be part of voltage regulation circuitry 246 of the computer system 200 and may furnish power to one or more power lines 242. In addition to the voltage regulation circuitry 246, the computer system 200 may also include an AC-to-DC converter 240 that may receive an AC wall voltage and convert the AC voltage into a DC voltage that is provided to the voltage regulation circuitry 246. The voltage regulation circuitry 246 may also receive a DC voltage from a battery pack 243 that furnishes power when AC power is unavailable.

Among the components that consume power and may receive the $V_{CORE}$ voltage, the computer system 200 may include a microprocessor 202 and a bridge circuit, or memory hub 206, both of which are coupled to a front side bus 204. The memory hub 206 may interface the front side bus 204, a memory bus 209 and an Accelerated Graphics Port (AGP) bus 211 together. A system memory 208 may be coupled to the memory bus 209, and a display controller 212 (that controls a display 214) may be coupled to the AGP bus 211. A hub communication link 205 may couple the memory hub 206 to another bridge circuit, or input/output (I/O) hub 210.

The I/O hub 210 includes interfaces to an Industry Standard Architecture (ISA) bus 216 and a Peripheral Component Interconnect (PCI) bus 230. An I/O controller 217 may be coupled to the ISA bus 216 and receive input data from a keyboard 224 and a mouse 226, as examples. The I/O controller 217 may also control operations of a floppy disk drive 222. A drive controller 231 may be coupled to the PCI bus 230. The drive controller 231 may control operations of a hard disk drive 232 and a CD-ROM drive 233, as examples.

Figure 31:
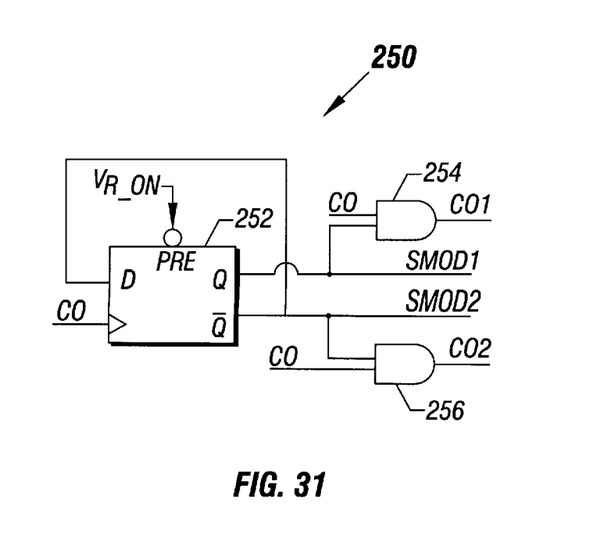
FIG. 31 is a schematic diagram of a synchronization circuit according to an embodiment of the invention.

Other embodiments are within the scope of the following claims. For example, the voltage regulator may include more or less than the four stages described above. More particularly, the voltage regulator may be, for example, a two stage regulator that may include the power stage 32 and the controller 39, as described above. However, because of the two stage design, this regulator may include just two switch circuits 34a and 34b, and the synchronization circuit 36 may be replaced by a synchronization circuit 250 that is depicted in FIG. 31. In particular, the synchronization circuit 250 may include a D-type flip-flop 252 that is clocked by the CO signal. The flip-flop 252 furnishes the SMOD1 signal at its non-inverting output terminal and furnishes the SMOD2 signal at its inverting output terminal. The preset terminal of the flip-flop 252 may receive the VR_ON signal, and the inverting output terminal of the flip-flop 252 may be coupled to the input terminal of the flip-flop 252. To produce the CO1 signal, the synchronization circuit 250 may include an AND gate 254 that receives the CO signal at one terminal and receives the SMOD1 signal at another terminal. The output terminal of the AND gate 254 furnishes the CO1 signal. To produce the CO2 signal, the synchronization circuit 250 may include an AND gate 256 that receives the CO signal at one terminal and receives the SMOD2 signal at another terminal. The output terminal of the AND gate 256 furnishes the CO2 signal.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A switching regulator comprising:
    a controller to furnish a switching signal to regulate an output voltage;
    an inductor;
    switch circuits coupled to the inductor, each switch circuit to, when activated, respond to the switching signal to energize and de-energize the inductor; and
    a synchronization circuit to selectably activate each switch circuit during different time intervals of the switching signal.

2. The switching regulator of claim 1, wherein each time interval has a duration of approximately one period of the switching signal.

3. The switching regulator of claim 1, wherein the controller comprises:
    a comparator circuit to generate the switching signal based on a level of the output voltage.

4. The switching regulator of claim 3, wherein the comparator circuit comprises a hysteretic comparator circuit.

5. The switching regulator of claim 1, wherein a terminal of the inductor furnishes the output voltage, the switching regulator further comprising:
    a bulk capacitor coupled between the terminal and ground.

6. The switching regulator of claim 1, wherein at least one of the switch circuits comprises:
    a switch to selectively couple an input energy source to the inductor in response to the switching signal.

7. The switching regulator of claim 1, wherein at least one of the switch circuits comprises:
    a switch to selectively couple the inductor to ground in response to the switching signal.

8. The switching regulator of claim 1, wherein the switching signal, during each of the time intervals, controls an energization/de-energization cycle of the inductor.

9. The switching regulator of claim 8, wherein the inductor stores energy during a first portion of the cycle and furnishes energy during a second portion of the cycle.

10. A method for use with a switching regulator, comprising:
    generating a switching signal to regulate an output voltage of the regulator;
    using the switching signal during first time intervals of the switching signal to operate a first switch circuit to energize and de-energize an inductor; and
    using the switching signal during second time intervals of the switching signal to operate a second switch circuit to energize and de-energize the inductor.

11. The method of claim 10, wherein the act of using the switching signal during the first time interval comprises:
    operating at least one switch to couple the inductor to an input energy source.

12. The method of claim 10, wherein each of the first time intervals has a duration of approximately one period of the switching signal.

13. The method of claim 10, wherein the first time intervals do not overlap the second time intervals in time.

14. A method for use with a switching regulator, comprising:
    operating a first switch circuit at a first frequency to energize and de-energize an inductor;
    operating a second switch circuit at a second frequency to energize and de-energize the inductor independently from the operation of the first switch circuit; and
    combining operations of the first and second switch circuits to collectively energize and de-energize to the inductor at a rate greater than either the first or second frequencies.

15. The method of claim 14, wherein the rate is approximately equal to a summation of the first and second frequencies.

16. The method of claim 14, further comprising:
    operating at least one additional switch circuit to independently energize and de-energize the inductor.

17. The method of claim 14, further comprising:
    regulating the operations of the first and second switch circuits to control an output voltage.

18. A computer system comprising:
    a processor receiving a supply voltage;
    a controller to furnish a switching signal to regulate the supply voltage;
    an inductor;
    switch circuits coupled to the inductor, each switch circuit to, when activated, respond to the switching signal to energize and de-energize the inductor; and
    a synchronization circuit to selectably activate each switch circuit during different time intervals of the switching signal.

19. The computer system of claim 18, wherein each time interval has a duration of approximately one period of the switching signal.

20. The computer system of claim 18, wherein the controller comprises:
    a comparator circuit to generate the switching signal based on a level of the output voltage.

21. The computer system of claim 18, wherein at least one of the switch circuits comprises:
    a switch to selectively couple an input energy source to the inductor in response to the switching signal.

22. The computer system of claim 18, wherein at least one of the switch circuits comprises:
    a switch to selectively couple the inductor to ground in response to the switching signal.

23. The computer system of claim 18, wherein the switching signal, during each of the time intervals, controls an energization/de-energization cycle of the inductor.

24. The computer system of claim 23, wherein the inductor stores energy during a first portion of the cycle and furnishes energy during a second portion of the cycle.

* * * * *